Oct. 28, 1958 H. J. PEPPERCORN 2,858,155

BUSHING ASSEMBLY

Filed June 14, 1955

INVENTOR
Howard J. Peppercorn

BY McCoy, Greene + de Grotenhuis
ATTORNEYS

United States Patent Office 2,858,155
Patented Oct. 28, 1958

2,858,155
BUSHING ASSEMBLY

Howard J. Peppercorn, Logansport, Ind., assignor to The General Tire and Rubber Company, Akron, Ohio, a corporation of Ohio Application June 14, 1955, Serial No. 515,487

1 Claim. (Cl. 287—85)

The present invention relates to a resilient rubber bushing assembly and more particularly to a bushing assembly in which the outer rigid sleeve is provided with a shallow circumferential groove or recess that holds the rubber insert in place after assembly until the temporary lubricant on the outer surface of the insert is absorbed.

Heretofore annular rubber inserts have popped out from between the inner and outer sleeve of a rubber bushing immediately after assembly due to the high stresses on the insert and the slippery nature of the temporary lubricant applied to the insert to facilitate the assembly. Such popping out of the insert could be avoided by holding the insert in place on the assembling machine until the temporary lubricant was absorbed, but such a procedure was impractical due to the waste of time in waiting for such absorption.

According to the present invention the outer rigid sleeve of the rubber bushing is provided with a shallow circumferential groove or recess of substantial axial length for holding the rubber insert in place relative to the outer sleeve until the lubricant is absorbed. Such a recess may be manufactured without substantially increasing the cost of the sleeve and permits high speed assembly of the bushings with a minimum number of rejects. Since such a recess is very small, the conventional rubber inserts and conventional assembly methods may be employed.

An object of the present invention is to provide an improved outer sleeve for a rubber bushing.

A further object of the present invention is to facilitate high speed assembly of resilient rubber bushings and to prevent the rubber inserts from popping out from between the inner and outer sleeves of the bushing just after assembly.

Other objects, uses and advantages of the present invention will become apparent to those skilled in the art from the following description and claim and from the drawings in which:

Figure 1:
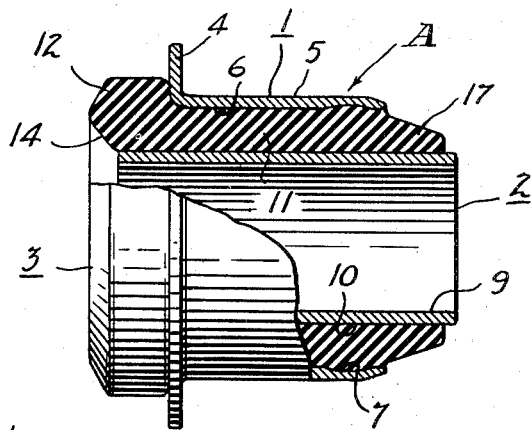
Figure 1 is a side elevational view on an enlarged scale with parts broken away and shown in section showing an assembled bushing made in accordance with the present invention.
Figure 2:
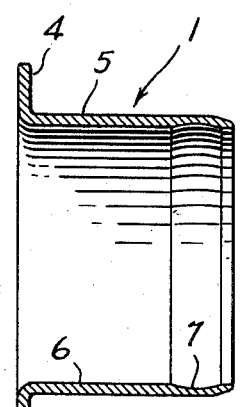
Figure 2 is a longitudinal vertical sectional view on the same scale as Fig. 1 showing the outer rigid sleeve of the bushing.
Figure 3:
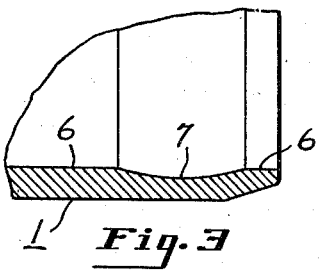
Figure 3 is a fragmentary longitudinal vertical sectional view showing a portion of the sleeve of Fig. 2 on an enlarged scale.

Referring more particularly to the drawings in which like parts are referred to by the same numerals throughout the several views, Figures 1 to 4 show a resilient rubber bushing A comprising an outer rigid metal annular sleeve 1, an inner annular rigid metal sleeve or core 2 spaced from and concentric to said outer sleeve and projecting axially beyond the opposite ends of said outer sleeve, and an annular resilient elastic rubber insert 3 compressed radially between the outer sleeve and the inner core.

The outer sleeve has a radially projecting portion at its forward end providing an annular radial flange 4 and an axially extending portion providing an external cylindrical surface 5 and an internal cylindrical surface 6 that extends substantially the full length of the sleeve. A shallow internal circumferentially continuous groove or recess 7 is of uniform axial width and uniform cross section and has a smoothly curved axially concave bottom surface. The groove preferably as a radial depth in the neighborhood of about 10 to 20 percent of the thickness of the sleeve and preferably has an axial length several times said thickness. The groove is preferably near the rear end of the sleeve but may be closer to the radial flange if desired. As herein shown the rear marginal edge of the groove 7 is spaced from the rear edge of the outer sleeve 1 a distance not substantially greater than the thickness of the sleeve.

The core 2 is of uniform radial thickness and uniform axial length and has cylindrical inner and outer surfaces 9 and 10 coaxial with the inner surface 6 of the outer sleeve.

The insert 3 has a main body portion 11 that is compressed between the surfaces 6 and 10 and has an enlarged end portion 12 at its forward end that projects radially outwardly to provide a radial flange for engaging the radial flange 4 in the assembled bushing. As herein shown the body portion 11 has an internal cylindrical surface 13 and the flanged end portion 12 has a tapered inner surface 14 to facilitate entry of the core 2 during assembly of the bushing. The body portion 11 also has an external cylindrical surface 15 coaxial with the inner surface 13 and extending rearwardly from the flange 12. A frusto-conical surface 16 may be provided at the rear end of the surface 15 to facilitate entry of the insert 3 into the outer sleeve 1 during assembly. The body portion also has a tapered rear end portion 17 of reduced diameter.

Figure 4:
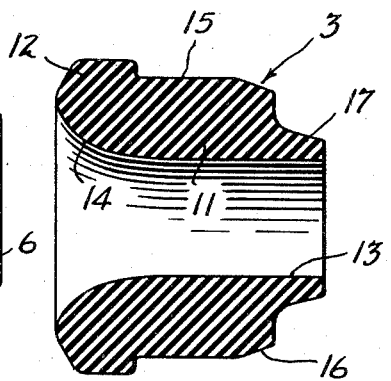
Figure 4 is a longitudinal vertical sectional view on the same scale as Figs. 1 and 2 showing the rubber insert of the bushing of Fig. 1 in the normal unstressed condition prior to assembly.

The insert 3 is drawn substantially to scale in Figs. 1 and 4 so that it will be apparent that the body portion 11 is compressed substantially when it is assembled between the outer sleeve 1 and the inner core 2. As shown herein the inner surface 13 of the insert has a diameter materially less than that of the outer surface 10 and the outer surface 15 of the insert has a diameter slightly greater than that of the inner surface 6 and greater than the maximum diameter of the groove 7 so that the body portion 11 is compressed radially and elongated axially when it is assembled between the inner and outer sleeves of the bushing. The ratio of the axial length of the portion 11 to its radial thickness is preferably increased at least 75 percent or so as it is assembled between the sleeves 1 and 2 and is usually increased about 100 to 200 percent for best results.

The bushing A may be assembled in any conventional manner for example as disclosed in the patent to Howard G. Beck, No. 2,660,780, issued December 1, 1953, and as disclosed in the copending application of Howard R. Sigler, et al., Ser. No. 370,783, filed July 28, 1953. A suitable rubber-to-metal lubricant is applied to the inner and outer surfaces of the insert 3 prior to assembly. The temporary lubricant may be mutton tallow or other suitable liquid or plastic lubricant. When the bushing A is assembled, the insert 3 projects radially into the groove 7 and is compressed radially between the concave bottom of the groove and the inner core 2. The rubber pressing against the bottom of the groove resists axial movement of the insert relative to the sleeve 1 with sufficient force effectively to prevent the insert from popping out from between the sleeve and the core. The groove 7 therefore holds the insert in place until the temporary lubricant on the outer surface of the insert is absorbed by the rubber. After the lubricant is absorbed there is little tendency for the insert to break loose from the bushing.

Figure 5:
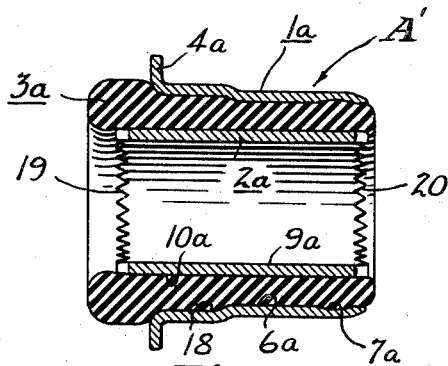
Figure 5 is a longitudinal vertical sectional view on an enlarged scale showing another form of bushing according to the present invention.
Figure 6:
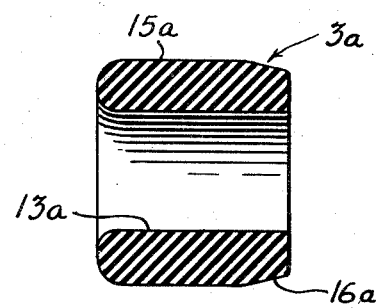
Figure 6 is a longitudinal vertical sectional view on the same scale as Fig. 5 showing the rubber insert of the bushing of Fig. 5 in its normal unstressed condition prior to assembly.

Figures 5 and 6 show a modified resilient rubber bushing A' comprising a rigid annular outer sleeve 1a, a rigid inner cylindrical sleeve or core 2a concentric to and spaced from the outer sleeve, and an annular resilient elastic rubber insert 3a compressed radially between the outer sleeve and the inner core.

The outer metal sleeve 1a has a radial flange 4a at its forward end and an internal cylindrical surface 6a that extends axially from the rear end of the sleeve more than half the length of the sleeve. As herein shown, the sleeve is enlarged between the surface 6a and the flange 4a and has an internal cylindrical surface 18 concentric to the surface 6a and of a greater diameter than said surface. The outer sleeve has an internal circumferential groove 7a similar to the groove 7 for holding the insert 3a in place after assembly until the temporary rubber-to-metal lubricant is absorbed by the rubber.

The inner core 2a has inner and outer cylindrical surfaces 9a and 10a and has serrated edges 19 and 20 at its opposite ends.

The insert 3a is of substantially uniform radial thickness throughout its length and has internal and external cylindrical surfaces 13a and 15a for engaging the outer and inner sleeves respectively. The insert is preferably tapered at its rear end to facilitate assembly of the insert between the inner and outer sleeves. As herein shown the insert has a frusto-conical outer surface 16a at its rear end so that the insert will readily enter the outer sleeve.

Figure 7:
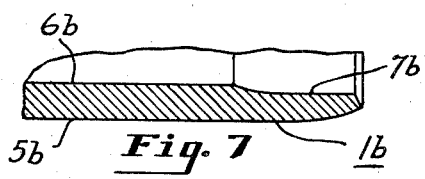
Figure 7 is a fragmentary longitudinal vertical sectional view similar to Fig. 3 showing a modified form of the invention.

It will be apparent that the annular shoulders formed in the sleeves 1 and 1a at the forward marginal edges of the circumferential grooves 7 and 7a engage the body portions of the rubber inserts 3 and 3a to prevent such inserts from popping out of the assembled bushing. It will also be apparent that such shoulders may be formed without forming a groove that decreases in diameter toward the rear of the sleeve. Figure 7 shows an outer annular rigid metal sleeve 1b which is the same as the sleeve 1 except that the rear end portion of the sleeve is shaped differently. The sleeve 1b may be employed in place of the sleeve 1 in the bushing A and may be assembled with the core 2 and the insert 3 shown in Figs. 1 and 4. The sleeve 1b has an external cylindrical surface 5b that extends to the radial flange of the sleeve and has an internal cylindrical surface 6b of the same diameter as the surface 6 which extends substantially to said radial flange. The rear end of the sleeve is reduced in radial thickness to provide a shallow circumferentially continuous recess 7b that extends from the inner surface 6b to the end of the sleeve, the forward portion of the recess being concave and smoothly curved to provide an annular shoulder to resist axial movement of the rubber insert out of the assembled bushing. The recess 7b has an axial length several times the radial thickness of the sleeve 1b and preferably has a maximum radial depth on the order of about 10 to 20 percent of said radial thickness so that the maximum internal diameter of the recess 7b is slightly greater than the diameter of the internal cylindrical surface 6b. It will be apparent that the reduced end portion forming the recess 7b functions substantially like the reduced end portions forming the recesses 7 and 7a so as to resist popping out of the rubber insert and to hold the insert in position until the temporary lubricant is absorbed.

The recesses 7, 7a and 7b need not be manufactured with any great accuracy and may readily be formed without substantially increasing the cost of manufacturing of the outer sleeve. The outer sleeves may be manufactured economically in automatic punching machines, for example of the general type shown in Ferris Patent No. 2,012,423, issued August 27, 1935, or higher speed machines of a more modern type. In such machines the sleeve is formed as it is advanced from die to die during punching operations. The circumferential recess may be formed during the punching operations by drawing the metal in the vicinity of the recess and, if desired, by striking one or more blows on the end of the sleeve to bend and/or thicken the metal at the end of the sleeve. Since the recess may be formed by simple punching operations in an automatic machine as the sleeves are advanced from die to die, such groove does not add substantially to the cost of manufacture.

It will be understood that, in accordance with the provisions of the patent statutes, variations and modifications of the specific devices disclosed herein may be made without departing from the spirit of the invention.

Having described my invention, I claim:

A resilient rubber bushing comprising a thin outer annular rigid sleeve of substantially uniform thickness having a radial flange at its front end, a circumferentially continuous portion of reduced radial thickness at its rear end, and a smooth internal cylindrical surface extending axially inwardly from said last-named portion, a distance not substantially less than half the axial length of said sleeve, the end portion of reduced radial thickness having an internal diameter slightly greater than the internal diameter of said cylindrical surface so as to form an annular shoulder at the rear end of said cylindrical surface, an inner rigid cylindrical core within said sleeve and concentric thereto, said core having an axially continuous external cylindrical surface within said outer sleeve and extending axially the full length of said outer sleeve, and an elastic rubber insert having a body portion between said sleeve and said core and in a state of appreciable radial compression and axial elongation and having an axially outwardly projecting front end portion engaging said radial flange, said body portion in the normal and unstressed condition prior to assembly having an external diameter greater than the diameter of said internal cylindrical surface and an internal diameter materially less than the external diameter of said core, said body portion engaging said portion of reduced radial thickness and being compressed radially between said reduced portion and said core, the entire internal surface of said outer sleeve between said shoulder and said radial flange being smooth and free of portions that increase in internal diameter toward said shoulder to facilitate axial sliding of the rubber insert into the outer sleeve, the rear end portion of said body portion engaging said shoulder substantially throughout its circumference and being held by said shoulder against axial movement toward said radial flange the maximum radial height of said annular shoulder being not substantially greater than one-tenth the radial thickness of said sleeve, said sleeve having its minimum internal diameter at said internal cylindrical surface.

References Cited in the file of this patent

UNITED STATES PATENTS

| | | |
|---|---|---|
| 2,004,712 | Thiry | June 11, 1935 |
| 2,661,969 | Thiry | Dec. 8, 1953 |

FOREIGN PATENTS

| | | |
|---|---|---|
| 944,459 | France | Apr. 6, 1949 |